(12) United States Patent
Freeman

(10) Patent No.: US 10,290,149 B2
(45) Date of Patent: May 14, 2019

(54) SYSTEM, METHOD AND SOFTWARE FOR INTERACTING WITH VIRTUAL THREE DIMENSIONAL IMAGES THAT APPEAR TO PROJECT FORWARD OF OR ABOVE AN ELECTRONIC DISPLAY

(71) Applicant: Maxx Media Group, LLC, Philadelphia, PA (US)

(72) Inventor: Richard S. Freeman, Philadelphia, PA (US)

(73) Assignee: Maxx Media Group, LLC, Philadelphia, PA (US)

( * ) Notice: Subject to any disclaimer, the term of this patent is extended or adjusted under 35 U.S.C. 154(b) by 0 days.

(21) Appl. No.: 15/482,563

(22) Filed: Apr. 7, 2017

(65) Prior Publication Data
US 2018/0158234 A1 Jun. 7, 2018

Related U.S. Application Data

(60) Provisional application No. 62/319,790, filed on Apr. 8, 2016, provisional application No. 62/319,794, filed on Apr. 8, 2016.

(51) Int. Cl.
*G06T 17/00* (2006.01)
*G06T 19/20* (2011.01)
*G06F 3/0481* (2013.01)
*G06T 15/10* (2011.01)
*H04N 13/117* (2018.01)
(Continued)

(52) U.S. Cl.
CPC .............. *G06T 17/00* (2013.01); *G06F 3/011* (2013.01); *G06F 3/017* (2013.01); *G06F 3/0304* (2013.01); *G06F 3/04815* (2013.01); *G06T 15/10* (2013.01); *G06T 19/20* (2013.01); *H04N 13/117* (2018.05); *G06T 2210/61* (2013.01); *G06T 2219/2004* (2013.01); *G06T 2219/2016* (2013.01); *G06T 2219/2021* (2013.01)

(58) Field of Classification Search
USPC ........................................................ 345/419
See application file for complete search history.

(56) References Cited

U.S. PATENT DOCUMENTS

| 3,723,904 A | 3/1973 | Bernier |
| 5,790,284 A | 8/1998 | Taniguchi et al. |
| 6,121,972 A | 9/2000 | Takahashi et al. |

(Continued)

FOREIGN PATENT DOCUMENTS

WO WO 2014/197387 12/2014

*Primary Examiner* — Kimbinh T Nguyen
(74) *Attorney, Agent, or Firm* — LaMorte & Associates, P.C.

(57) ABSTRACT

A system and method of interacting with a virtual object in a virtual environment using physical movement. The virtual scene contains a 3D object that appears to extend forward or above the plane of the display. A sensor array is provided that monitors an area proximate the display. The sensor array can detect the presence and position of an object that enters the area. Action points are programmed in, on, or near the virtual objects. Each action point has virtual coordinates in said virtual scene that correspond to real coordinates within the monitored area. Subroutines are activated when the sensor array detects an object that moves to real coordinates that correspond to the virtual coordinates of the action points.

10 Claims, 10 Drawing Sheets

(51) Int. Cl.
    *G06F 3/01*    (2006.01)
    *G06F 3/03*    (2006.01)

(56) References Cited

U.S. PATENT DOCUMENTS

| | | |
|---|---|---|
| 6,614,427 B1 | 9/2003 | Aubrey |
| 6,657,998 B2 | 12/2003 | Li |
| 7,364,300 B2 | 4/2008 | Favalora et al. |
| 7,589,759 B1 | 9/2009 | Freeman et al. |
| 2009/0237564 A1* | 9/2009 | Kikinis ............ H04N 13/0296 348/584 |
| 2010/0151944 A1* | 6/2010 | Novelo ................ A63F 13/10 463/32 |
| 2011/0216002 A1 | 9/2011 | Weising et al. |
| 2012/0117514 A1 | 5/2012 | Kim et al. |
| 2013/0222385 A1* | 8/2013 | Dorsey ................ G06T 11/20 345/427 |
| 2013/0293547 A1* | 11/2013 | Du ........................ G06T 15/06 345/426 |
| 2014/0015831 A1 | 1/2014 | Kim et al. |
| 2014/0028810 A1* | 1/2014 | Genova ............ H04N 13/0011 348/51 |
| 2014/0066178 A1* | 3/2014 | Kelly .................... H04N 13/04 463/25 |
| 2015/0065221 A1 | 3/2015 | Liping |
| 2015/0193982 A1* | 7/2015 | Mihelich ............. H04W 4/026 345/633 |
| 2016/0203634 A1* | 7/2016 | Vesely .................. G06F 3/012 345/419 |
| 2016/0293133 A1* | 10/2016 | Dutt ......................... G06F 8/20 |
| 2018/0122150 A1* | 5/2018 | Bidne ................... G06T 15/00 |

* cited by examiner

SYSTEM, METHOD AND SOFTWARE FOR INTERACTING WITH VIRTUAL THREE DIMENSIONAL IMAGES THAT APPEAR TO PROJECT FORWARD OF OR ABOVE AN ELECTRONIC DISPLAY

RELATED APPLICATIONS

This application claims the benefit of both U.S. Provisional Patent Application No. 62/319,790, filed Apr. 8, 2016 and U.S. Provisional Patent Application No. 62/319,794, filed Apr. 8, 2016.

BACKGROUND OF THE INVENTION

1. Field of the Invention

In general, the present invention relates to interactive electronic detection and display systems where the motions of a viewer are translated into interactive controls that enable the viewer to manipulate a forward and/or vertically projected three-dimensional image. More particularly, the present invention relates to detection and display systems that translate user/viewer movements into control commands for projected three-dimensional images in a virtual environment.

2. Prior Art Description

Many people experience virtual environments through the playing of a video game. Video games present a virtual environment in which the action of the video game takes place. Typically, a person playing a video game is presented with a control module so that they can control various elements within the virtual environment. If the video game is played with a gaming console, the control module is a handset that communicates with the gaming console. If the virtual environment is presented on an electronic device, such as a smart phone or a tablet computer, then the control module is typically the touch screen or other controls that are built into the electronic device.

As the programming of virtual environments has evolved, motion sensor controllers have been developed so that people can interact with a virtual environment in a more natural manner. Motion sensor controllers detect movements of a person or an object using cameras, reflected infrared light, reflected ultrasonic sound waves, and/or other methods. Detected movements are converted into command signals. In this manner, a handheld control module need not be used. An example of a prior art motion controller is the Kinect® controller system that is used by Microsoft® with its Xbox® game consoles.

Most virtual environments are viewed two-dimensionally. That is, all the graphics contained within the virtual environment are designed to be viewed on a traditional two-dimensional LED display or LCD display with no three-dimensional effects. Consequently, most controllers, be they handheld controllers or motion controllers, are also designed for a virtual environment that is viewed two-dimensionally.

A challenge arises when a controller is needed to interact with a virtual environment that is designed to be viewed three-dimensionally, rather than two-dimensionally. Virtual environments that are viewed three-dimensionally can be generated using many methods. Most methods involve imaging an environment from two stereoscopic viewpoints. The images are superimposed and are varied in color, polarity and/or otherwise to vary the views observed by the left and right eyes of a viewer. For the images to appear to be three-dimensional, the images have to be viewed with specialized 3D glasses or viewed on an auto-stereoscopic display. In this manner, different aspects of the image can be perceived by the left and the right eyes, therein creating a three dimensional effect.

The controls used to manipulate a 3D object in a 3D virtual environment require that a controller have the capability to create movement in the x-axis, y-axis and z-axis. In U.S. Patent Application Publication No. 2012/0117514 to Kim, a prior art system is disclosed where a person's hand is used as a 3D controller. The hand is imaged with a camera and the image is projected into a virtual environment. The system is limited to virtual environments where the 3D virtual environment appears to exist below or behind the display screen.

In U.S. Patent Application Publication No. 2014/0015831 to Kim, the control accuracy of the earlier system is improved by adding a physical object that the hand can touch. Movements to the physical control object are perceived as control signals to control a virtual object in a virtual environment. In order for the physical control system to work well, the physical control object being manipulated has to be generally the same shape and size as the virtual object. Thus, the system is not very dynamic because only a limited number of physical control objects exist.

Using certain techniques that are disclosed in co-pending patent application Ser. No. 15/481,447 to Freeman et al., virtual 3D images can be created that appear to be above or in front of the surface of the screen from which they are displayed. When a virtual 3D image appears in front of or above a display, a viewer may be tempted to reach out and touch the 3D image. The 3D image being displayed is virtual, so this cannot be done. However, the applicant herein presents a system where a 3D image that is projected forward or above its display can be finely manipulated and controlled by interacting with the space where the virtual 3D image appears to be. The details of this improved control system are described and claimed below.

SUMMARY OF THE INVENTION

The present invention is a system and method of interacting with a virtual 3D image in a virtual environment using physical movement. The virtual 3D image is part of a virtual scene that is visible on the display of an electronic device. The electronic device runs a software application that presents the virtual scene. The virtual scene contains one or more virtual 3D objects that appear to a user to extend forward or above the plane of the display's screen and into a first area proximate the display. The first area is the area immediately above or in front of the display's screen, depending upon the orientation of the screen.

A sensor array is provided that monitors the first area proximate the display. The sensor array can detect the presence and position of a physical object and/or a beam of light that enters the first area.

The virtual scene is presented on the display, wherein one or more virtual 3D objects appear to extend away from said display and into the first area. Action points are programmed in, on, or near the virtual 3D objects. Each action point has virtual coordinates in said virtual scene that correspond to real coordinates within the first area when said virtual scene is viewed in the first area.

Subroutines are provided in the virtual scene software that alters the virtual object in the virtual scene when activated. The subroutines are assigned to the action points. The subroutines are activated when the sensor array detects a physical object, or a user controlled object, such as a beam of light in the first area that moves to real coordinates corresponding to the perceived coordinates of the action points in the virtual scene.

The sensor array can also contain imaging sensors that image the area surrounding the periphery of the display. The imaging sensors scan and detect the presence of a head or face that is viewing the display. Once a viewer's head or face is identified, the position of the head or face with reference to the display is calculated. The virtual scene can be altered to better optimize 3D effects and/or optimize the perceived location of the action points to the viewer at that viewpoint.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention system and method can be used to control most any object in a 3D virtual environment, the system and method are especially well suited for controlling an object that is projected above or in front of the screen of an electronic display. For the purposes of description and explanation, the virtual object used in the illustrations is a dinosaur. The dinosaur is exemplary and is intended to represent any object that can be virtually displayed to appear above the screen of a display. Since the illustrated embodiment is merely exemplary, it should not be considered a limitation when interpreting the scope of the appended claims.

Figure 1:
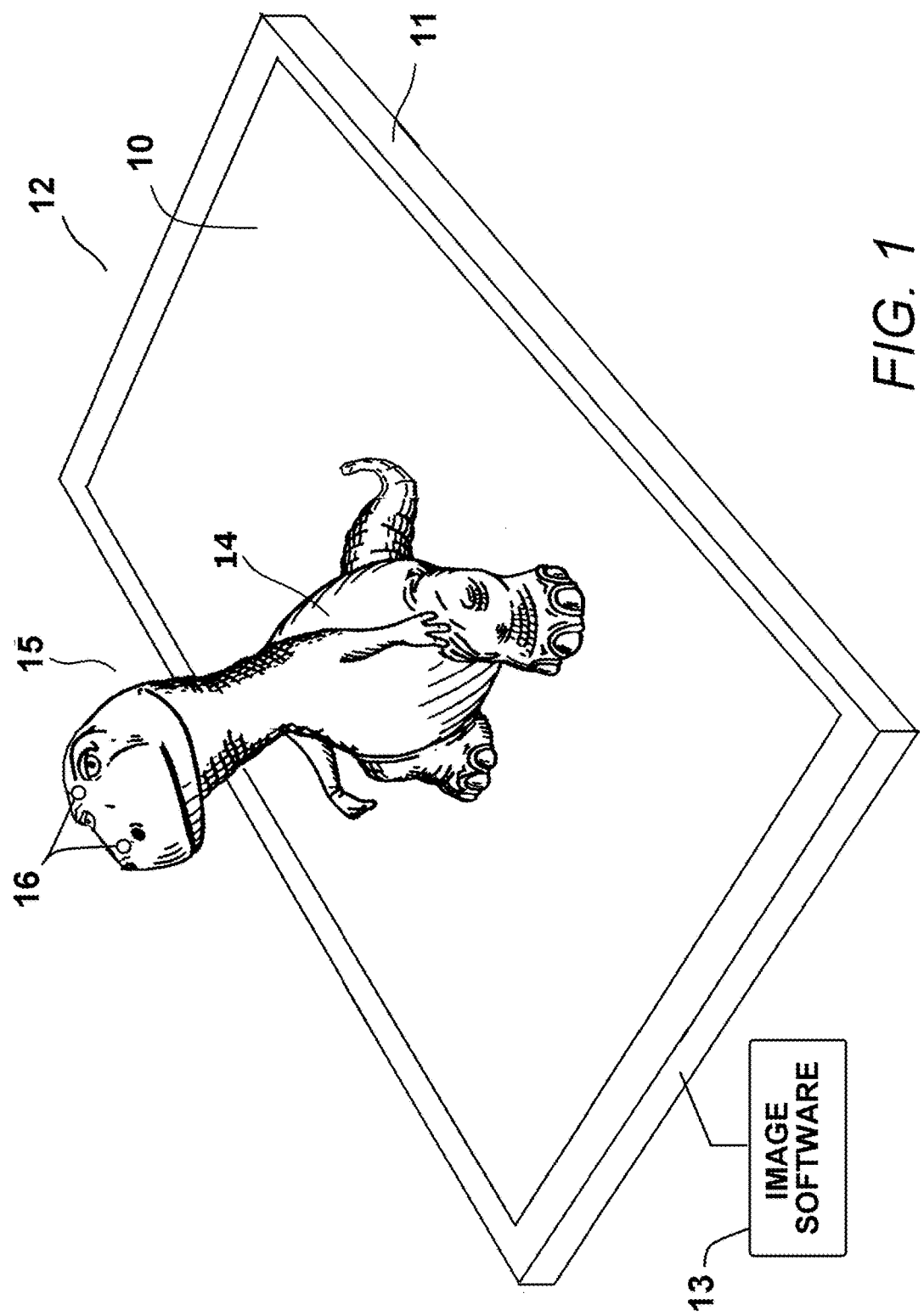
FIG. 1 is a perspective view of an exemplary embodiment of a virtual scene shown on an electronic display.

Referring to FIG. 1, an electronic display 10 is shown. The electronic display 10 can be a stand-alone electronic display or can be part of an electronic device 11, such as a tablet computer, a smart phone, or any other computer device. The electronic display 10 runs application software 13 that enables the electronic display 10 to show a virtual scene 12. The virtual scene 12 includes a primary object 15. In the virtual scene illustrated, the primary object 15 is configured as a dinosaur 14. The virtual scene 12 in the illustrated embodiment can be a stereoscopic or an auto-stereoscopic scene. That is, the virtual scene 12 is designed to present at least the primary subject object 15 as three-dimensional when viewed with special glasses or with no glasses when displayed on an auto-stereoscopic display.

Within the electronic device 11 is a microprocessor that runs the application software 13. The application software 13 generates the virtual scene 12. In order to display the virtual scene 12, the application software 13 calculates the virtual x-y-z coordinates of the primary subject object 15 and any other secondary objects (not shown) that are designed to appear to be three-dimensional within the virtual scene 12.

As will later be explained in greater detail, action points 16 are programmed into the virtual scene 12. The actions points 16 correspond to points on, in, and around the primary subject object 15. In the virtual scene 12, there are virtual coordinates in the X-axis, Y-axis, and Z-axis assigned to the virtual image. The application software 13 can calculate the virtual x-y-z coordinates of all action points 16 designed into the virtual scene 12. Therefore, the position of action points 16 in the virtual scene 12 are known variables.

Figure 2:
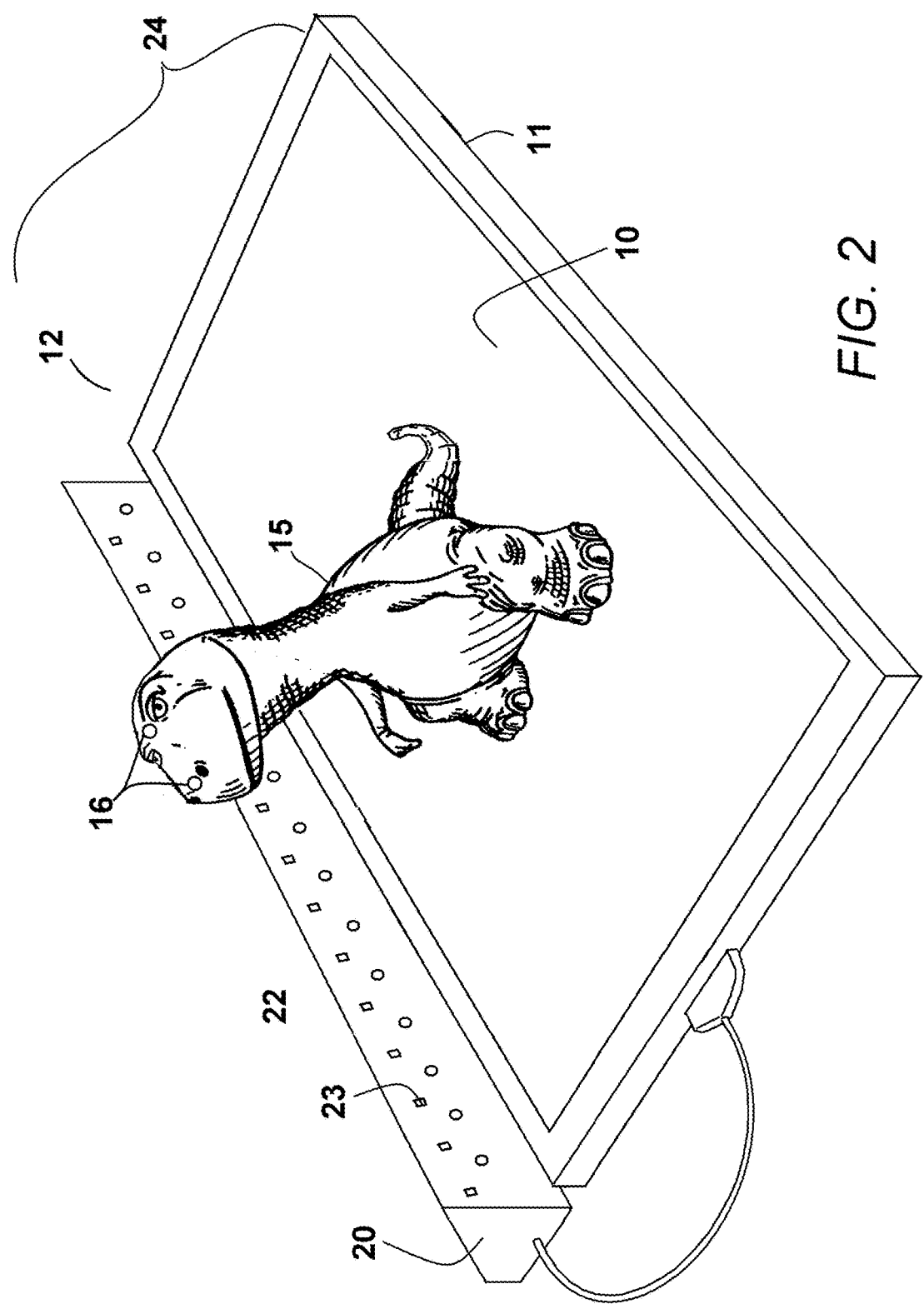
FIG. 2 shows the same view as FIG. 1 shown in conjunction with a detection module.

Referring to FIG. 2, it can be seen that a detection module 20 is provided. The detection module 20 contains a sensor array 22 that is oriented at an acute angle relative to the horizontal. The detection module 20 is placed on a flat surface next to the electronic display 10. The detection module 20 contains at least some sensors 23 that can sense the location and movement of any real object in space in a monitored area 24 immediately above the electronic display 10 and adjacent to or above the detection module 20. Alternatively, the sensor may detect an object, such as a light beam, that is manipulated through the monitored area by the user.

At least some of the sensors 23 in the sensor array 22 of the detection module 20 are object position detection sensors. These sensors 23 are focused across the monitored area 24. The monitored area has the same periphery as the display 10 and extends in front of or above the display depending upon the orientation of the display 10. Physical objects that enter the monitored area 24 can be readily detected and the position of the physical object can be calculated using software analysis. There are many object position detection sensors that are commercially available. Such sensors include infrared light reflection sensors, laser light reflection sensors, ultrasonic sound reflection sensors, camera sensors and other imaging sensors. Any such sensor can be adapted for use in the present invention.

In the illustrated embodiment, the electronic device 11 is placed flat on a horizontal surface so that the electronic display 10 is facing upwardly. The detection module 20 is placed adjacent to the electronic device 11. The detection module 20 has sensors 23 positioned to detect physical movement in the monitored area 24 above the electronic display 10 from the surface of the electronic display 10 to a selected height. The selected height is at least as high as the height of the primary object 15 in the virtual scene 12. The detection module 20 is interconnected with the electronic device 11 so that the internal microprocessor can receive the data sensed by the detection module 20. In the illustrated embodiment, the detection module 20 is physically connected to the electronic device 11 with a cable. However, it will be understood that wireless connections, such as Bluetooth® data links can be used.

Figure 3:
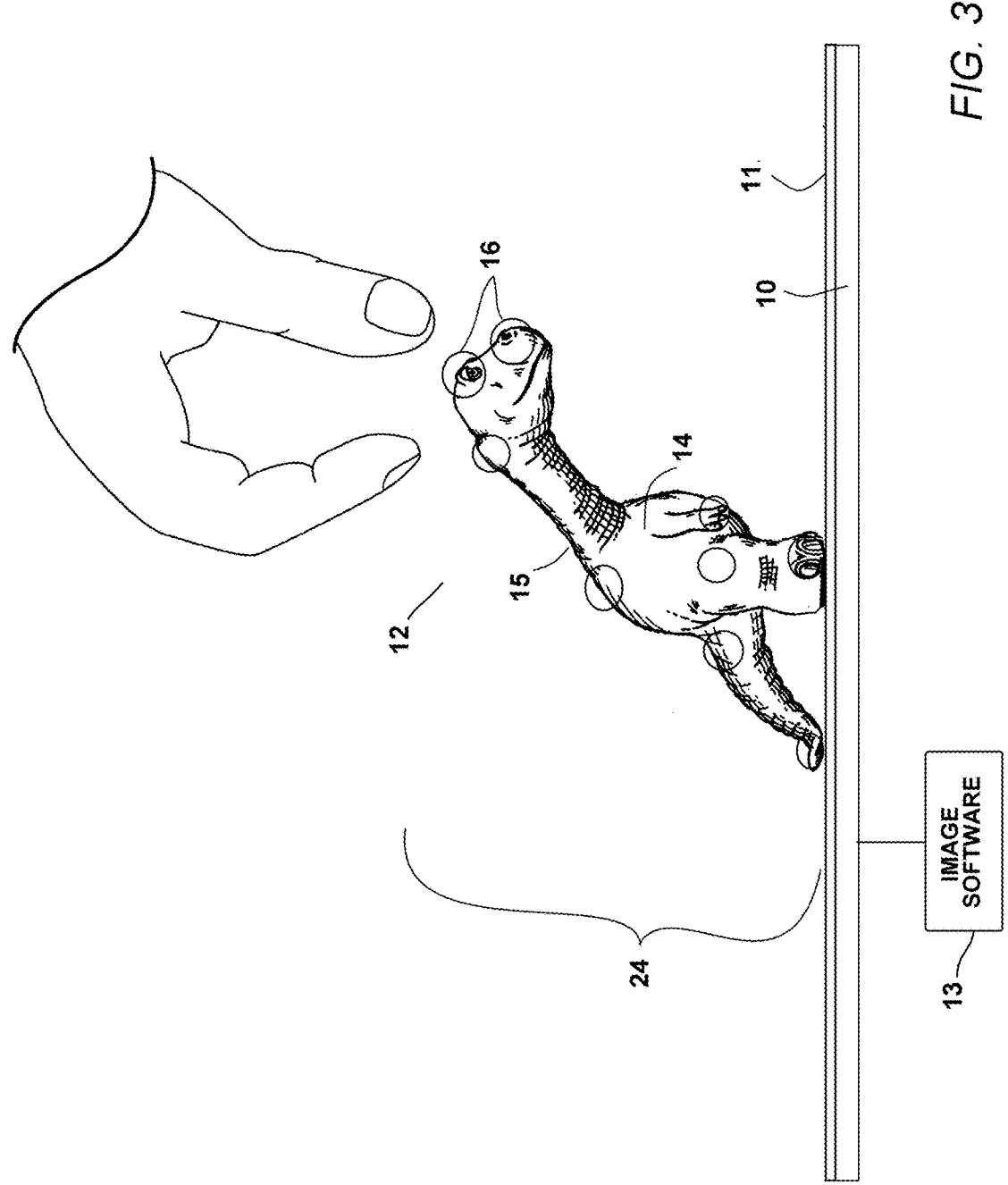
FIG. 3 is a side view of the virtual scene of FIG. 1 and FIG. 2, showing action points.
Figure 4:
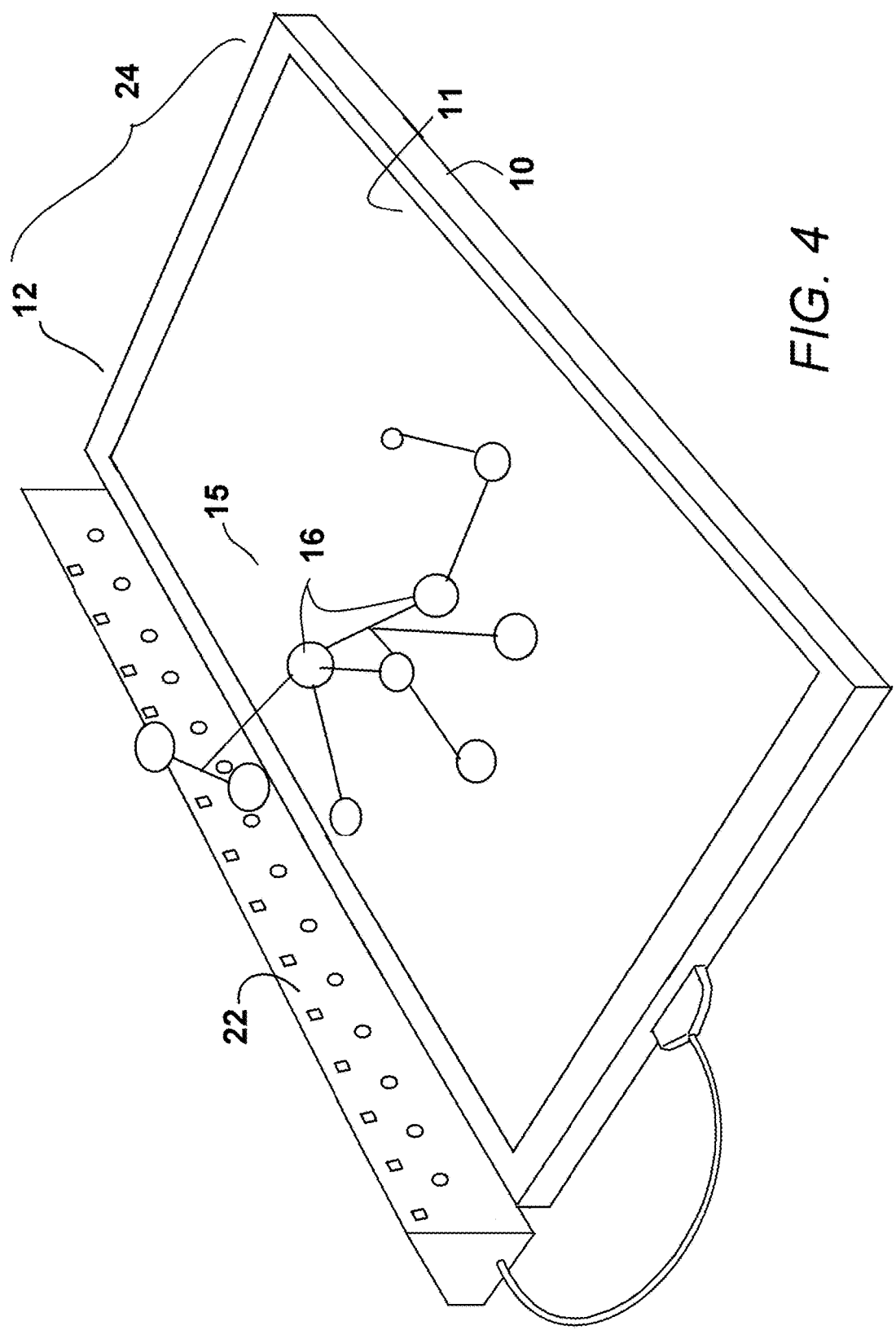
FIG. 4 is the same perspective view as FIG. 3 with the action points of an image object displayed.

Referring to FIG. 3 and FIG. 4 in conjunction with FIG. 2, the purpose of the action points 16 is explained. The action points 16 are assigned to various positions in, on and around the primary object 15 within the virtual scene 12. The positions of the action points 16 change as the virtual scene 12 changes. Each action point 16 is assigned as a trigger to a preprogrammed software subroutine that alters the virtual scene 12 in some way. For example, an action point 16 can be assigned to the tip of the nose of the dinosaur 14 being displayed. If that action point 16 is triggered, a subroutine can run that causes the virtual dinosaur 14 to change its position relative to the manner in which the trigger point 16 is manipulated. For example, if the action point 16 at the nose of the dinosaur 14 is virtually touched by a person reaching into the monitored area 24, then the position of the nose will change in reaction to the angle of approach of the user's touch. It will therefore be understood that the position and other aspects of the dinosaur 14 in the virtual scene 12 can be altered by the user. Alternatively, touching action point 16 may cause the dinosaur 14 to perform a specific pre-programmed action, such as a growl and/or biting motion.

In the shown embodiment, only a few action points 16 are illustrated. It will be understood that virtual scenes can be created with dozens or even hundreds of action points. Furthermore, more than one subroutine may be assigned to the same action point 16. In this manner, the dinosaur 14 may growl and bite the first time the nose action point is triggered and may sneeze the second time the nose action point is triggered.

The electronic display 10 shows the virtual scene 12 in three-dimensions. As such, the virtual scene 12 appears to project above the surface of the electronic display 10 when properly viewed. As a person moves a finger or another object into the monitored area 24 above the electronic display 10, the detection module 20 detects the movement and the current location of the physical object relative the surface of the electronic display 10. The location data for the object is read to the microprocessor within the physical electronic device 11 that controls the electronic display 10.

The software 13 being run by the microprocessor converts the location data from the detection module 20 to the virtual coordinates being used in the virtual scene 12. If the virtual coordinates of the detected physical object intersects the virtual coordinates of one of the action points 16 in the virtual scene 12, then that action point 16 becomes triggered. As an action point 16 triggers, the subroutine associated with that action point 16 runs and the virtual scene 12 is altered. As such, if a person touches the virtual nose of the dinosaur 14 with a real pencil, the dinosaur 14 may growl and bite, by way of example.

Figure 5:
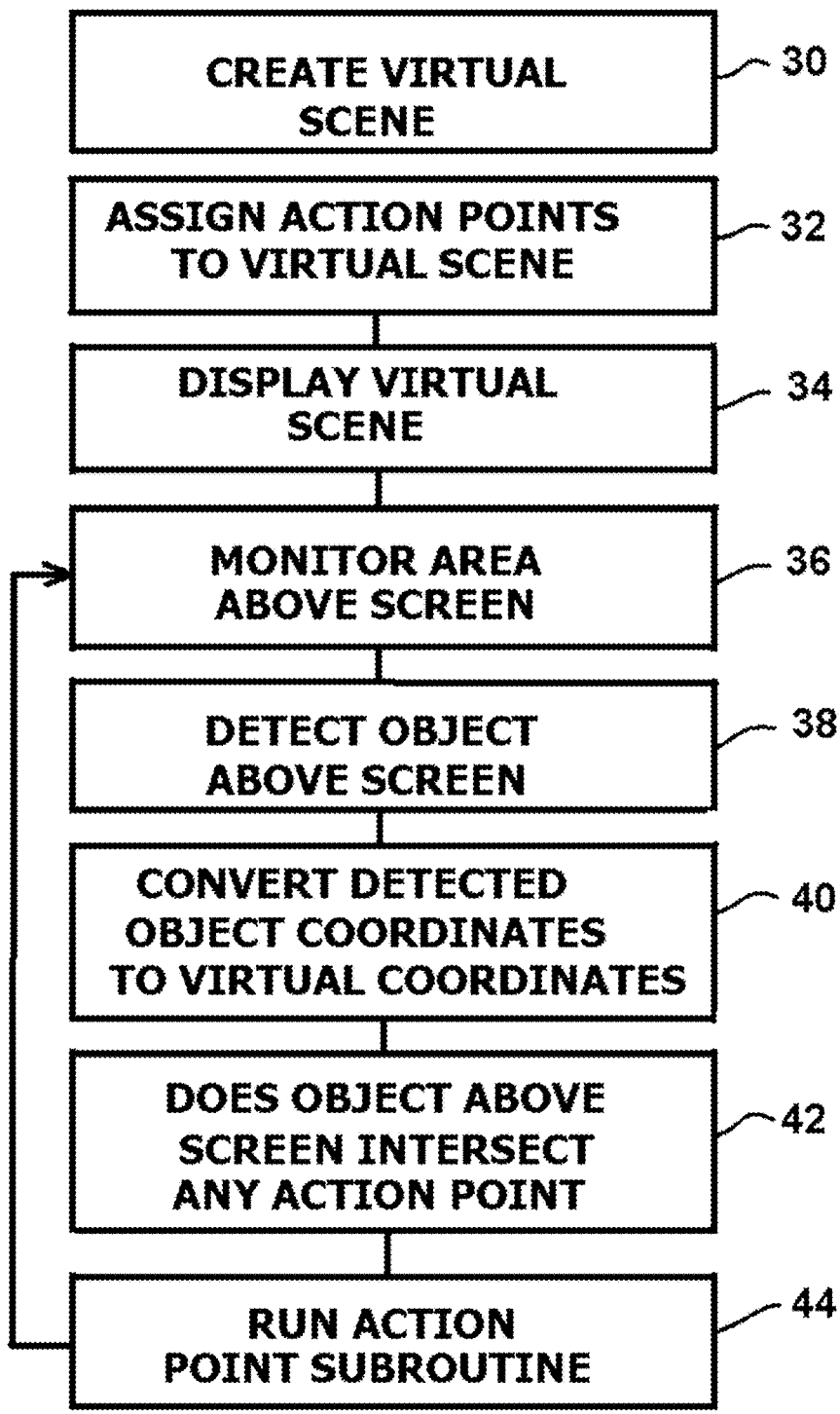
FIG. 5 is a block flow diagram showing a first software operational methodology associated with the invention.

Referring to FIG. 5 in conjunction with all earlier figures, it will be understood that a virtual scene 12 is created using commercially available graphic software that makes elements of the virtual scene 12 appear to be three dimensional. See Block 30. Such a process is described in co-pending patent application Ser. No. 15/481,447 to Freeman et al., the disclosure of which is herein incorporated by reference. However, other stereoscopic or auto-stereoscopic 3D imaging and/or animation creation techniques can be used.

Within the virtual scene 12, a programmer places action points 16 and assigns subroutines to those action points 16. See Block 32. The virtual scene 12 is then shown on the electronic display 10. See Block 34.

The detection module 20 is positioned adjacent to the electronic display 10, wherein the detection module 20 scans the monitored area 24 above the electronic display 10. See Block 36. If a person moves a physical object into the monitored area 24 above the electronic display 10, then the object is detected by the detection module 20. See Block 38. The position of the physical object is converted into the virtual coordinates of the virtual scene 12. See Block 40.

If the virtual coordinates of a physical object intersect the virtual coordinates of an action point 16, then a subroutine is run and the virtual scene 12 is altered. See Block 42 and Block 44. The process is looped, so as to be continuously interactive.

Figure 6:
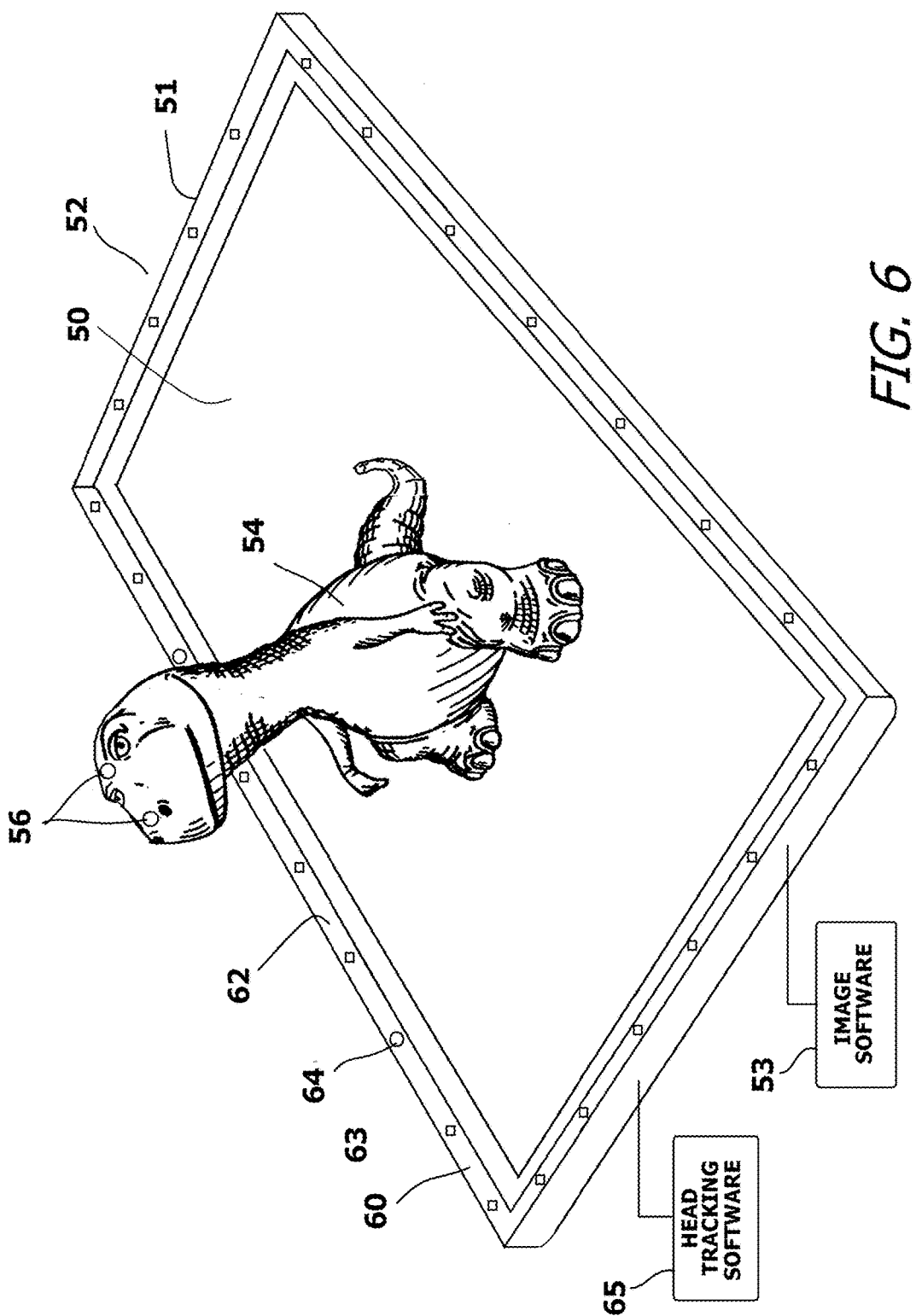
FIG. 6 is a perspective view of an exemplary embodiment of a virtual scene shown on an alternate electronic display having detection sensors built into the frame of the display.

Referring now to FIG. 6, a second embodiment is shown. Referring to FIG. 6, an electronic display 50 is shown. The electronic display 50 is an auto-stereoscopic display that can show an image that is perceived as 3D without the viewer having to wear specialized glasses. The electronic display 50 is showing a virtual scene 52 that includes a dinosaur 54. The dinosaur 54 in the virtual scene 52 appears to be three-dimensional when viewed.

The electronic display 50 is part of an electronic device 51. The electronic device 51 has a microprocessor that is running application software 53 appropriate for the operating system of the electronic device 51. The application software 53 generates the virtual scene 52 and can assign action points 56 to the virtual scene 52.

The periphery of the electronic display 50 is surrounded by a sensor array 60. The sensor array 60 contains two primary sensor types. The first sensors are object detection sensors 63, such as those used and described in the earlier embodiment. The object detection sensors 63 are directed to the area above the electronic display 50, but within the projected periphery of the electronic display 50. The second type of sensors are cameras or other imaging sensors 64. The imaging sensors 64 image the area surrounding the electronic display 50 outside the periphery of the electronic display 50.

Figure 7:
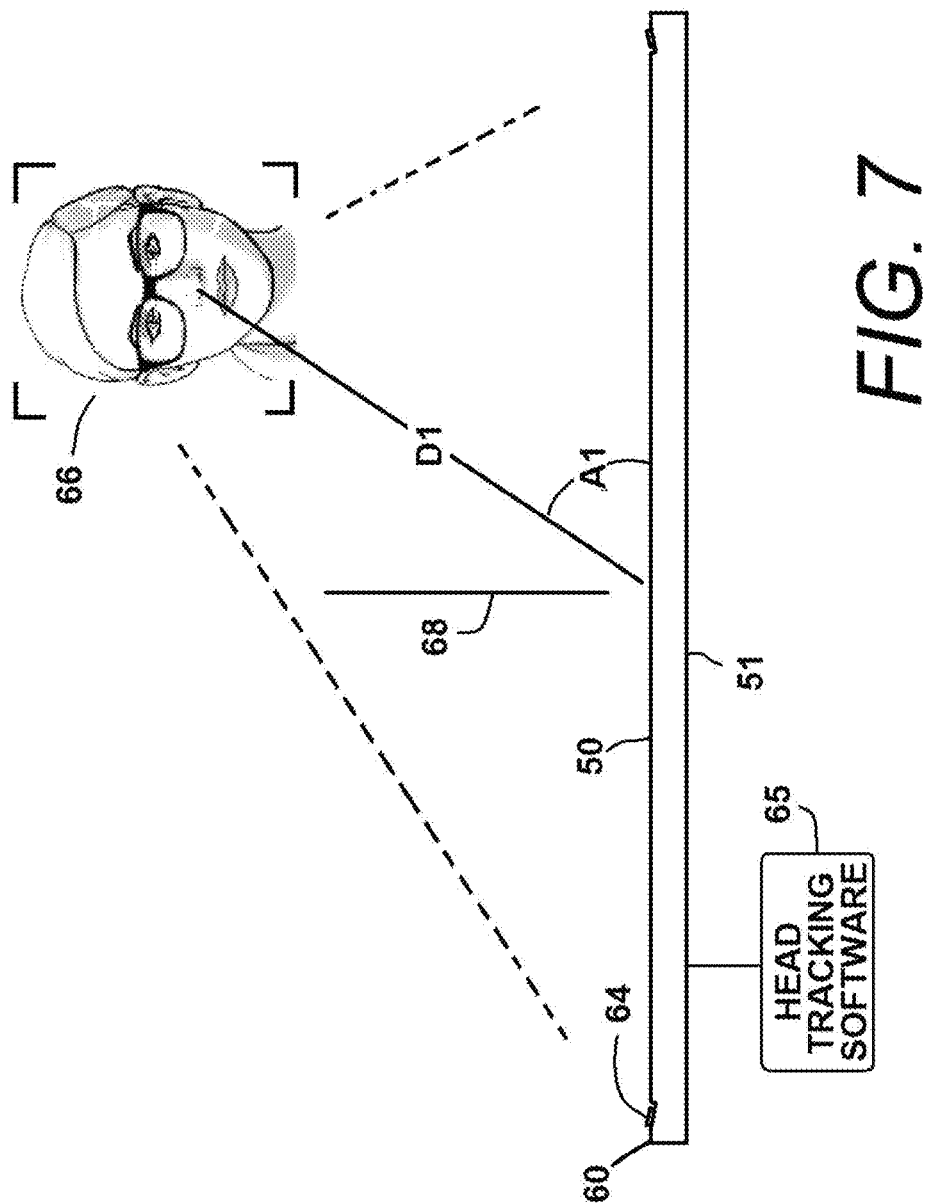
FIG. 7 shows a side view of the embodiment of FIG. 6 shown in conjunction with an identified face of a viewer viewing the display.

Referring to FIG. 7 in conjunction with FIG. 6, it will be understood that within the electronic device 11, a microprocessor runs commercially available head-tracking software 65. Head-tracking software 65 is software that can scan a camera image and identify the presence and location of a human head or face 66 in that camera image. Several head-tracking software programs are commercially available including the Visage/SDK software of Visage Technologies of Linkoping, Sweden. Head-tracking software 65 enables the microprocessor to determine if a person is standing near the electronic device 51 and where that person's head/face 66 is located in reference to the electronic display 50. Using sizing algorithms, the microprocessor can also determine which heads of viewers are closest to the electronic display 50 and are likely to be viewing the electronic display 50.

Once a viewer's head/face 66 is detected and is determined to be likely viewing the electronic display 50, the microprocessor can estimate the position of the head/face 66 relative to the plane of the electronic display 50. This estimation includes a distance D1 between the electronic display 50 and the head/face 66, an angle of elevation A1, and the position of the head/face 66 to the right or left of a centerline 68 of the electronic display 50.

The microprocessor utilizes the estimates for distance D1, angle of elevation A1, and position right or left of centerline 68 to shift and/or alter the virtual scene 52. The virtual scene 52 is optimized for viewing from the distance D1, angle of elevation A1, and right or left of the centerline 68 position detected. The optimization ensures that the virtual scene 52 is shifted and/or altered to produce the best 3D effects. The optimization also ensures that the action points are properly positioned from the viewpoint of a viewer at the distance D1, angle of elevation A1, and position right or left of centerline 68.

It is also possible that the imaging sensors 64 may detect more than one viewer looking at the electronic display 50.

The microprocessor can produce more than one virtual scene 52. The different virtual scenes 52 can then be optimized for the different viewers. Each viewer's mind will focus on the clearer of the two images being presented. As such, two or more viewers can look at the same electronic display 50 and each can be presented with a different virtual scene 52 because each is viewing the electronic display 50 from a different viewpoint.

As mentioned, the sensor array 60 also contains object position sensors 63 that can sense the location and movement of any object in space in a monitored area immediately above the electronic display 50 and within the range of the sensor array 60.

Figure 8:
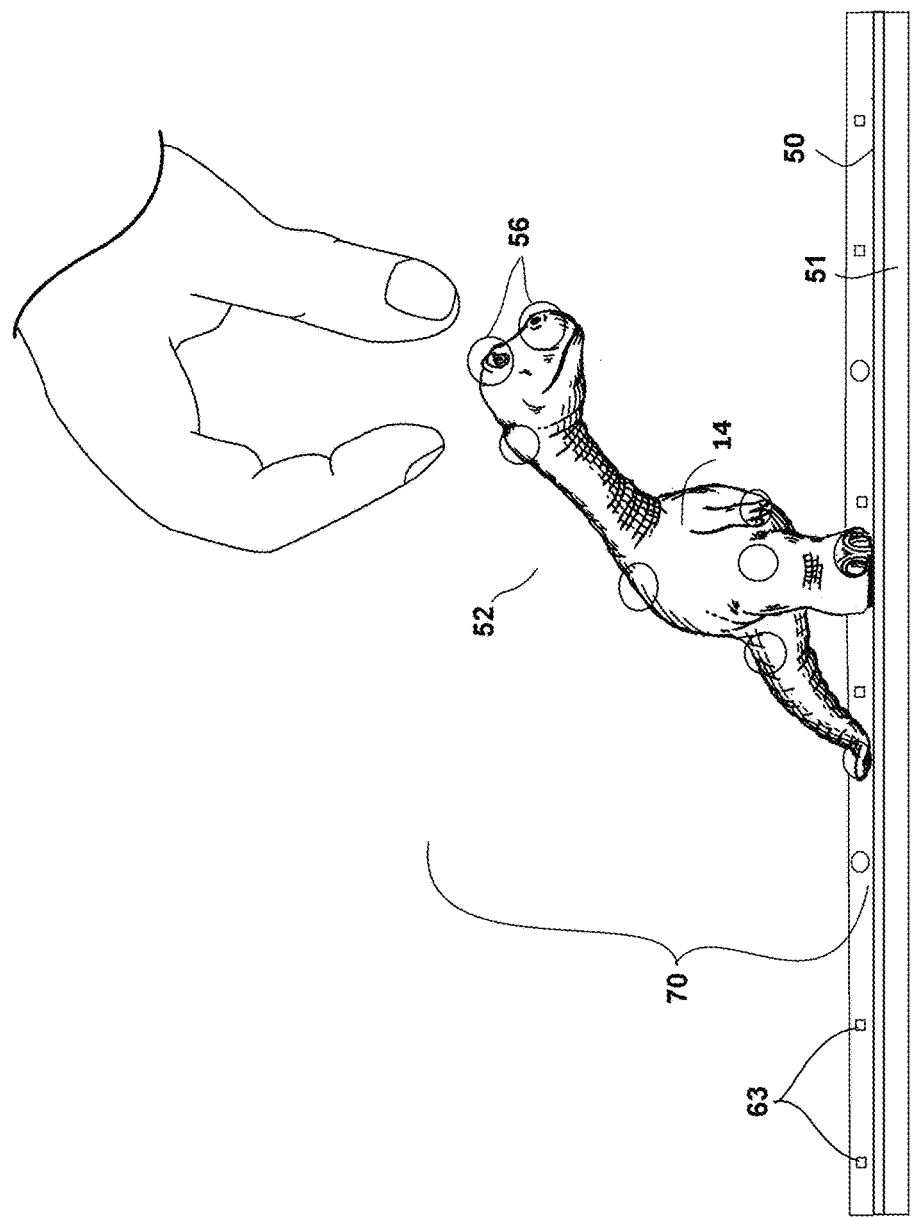
FIG. 8 is a side view of the virtual scene of FIG. 6 showing action points over-laid on a 3D image.
Figure 9:
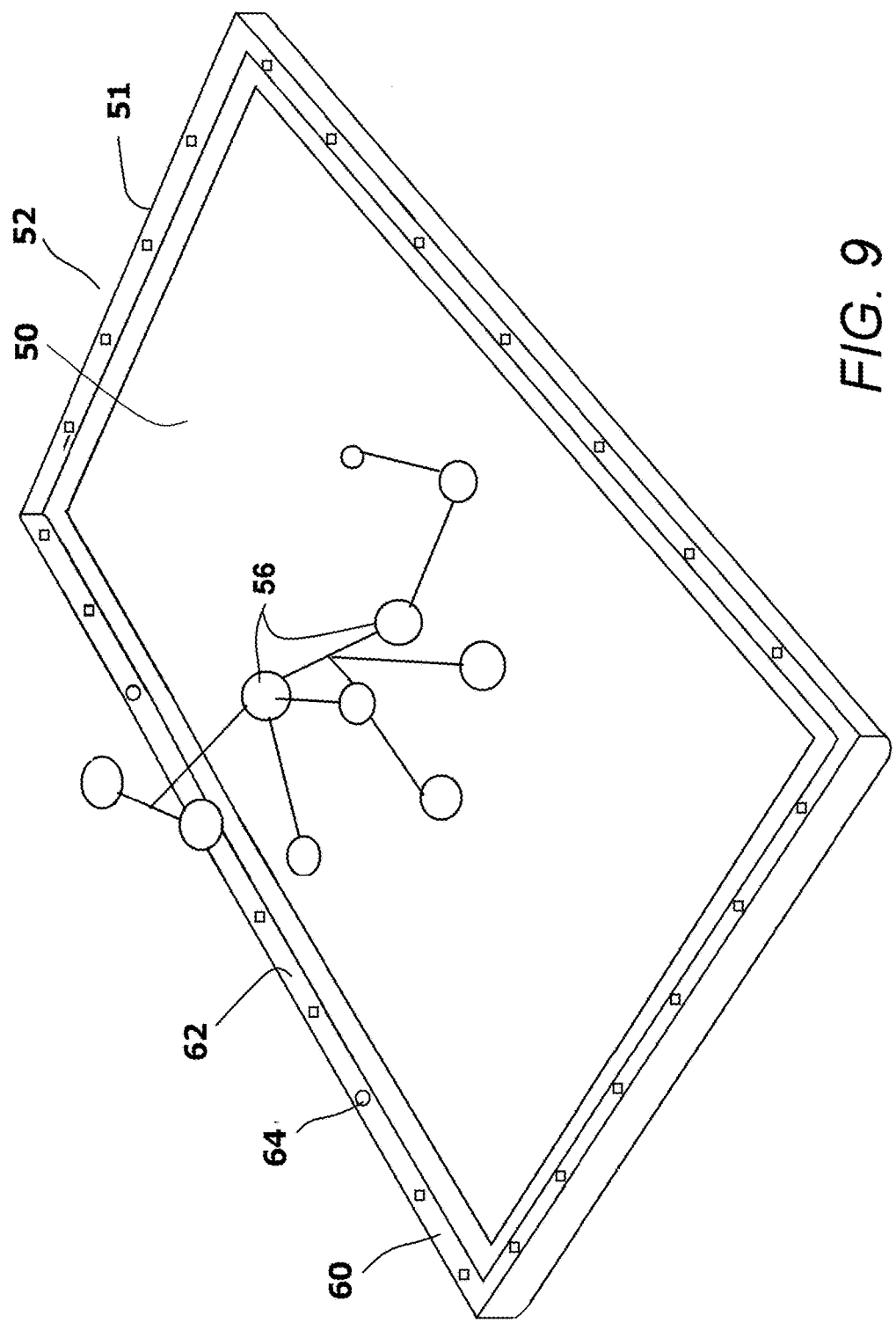
FIG. 9 is a perspective view of FIG. 8 with the action points of an image object displayed.

Referring to FIG. 8 and FIG. 9 in conjunction with FIG. 6, it will be understood that action points 56 are assigned to elements of the virtual scene 52 in the manner previously described. Interactive software programming is used to detect input, and control response and feedback. Each action point 56 is assigned as a trigger to the preprogrammed subroutines that interpret input, determine the correct preprogrammed response, alter the virtual scene 52 in some way, and provide whatever feedback, if any, is preprogrammed in the subroutines.

The electronic display 50 shows the virtual scene 52 in three-dimensions. As such, the virtual scene 52 appears to project above the screen of the electronic display 50 when properly viewed. As a person moves a finger or another physical object into the monitored area 70 above the electronic display 50, the object detection sensors 63 detect the movement and the current location of the physical object. The location data for the physical object is read to the microprocessor within the electronic device 51.

Figure 10:
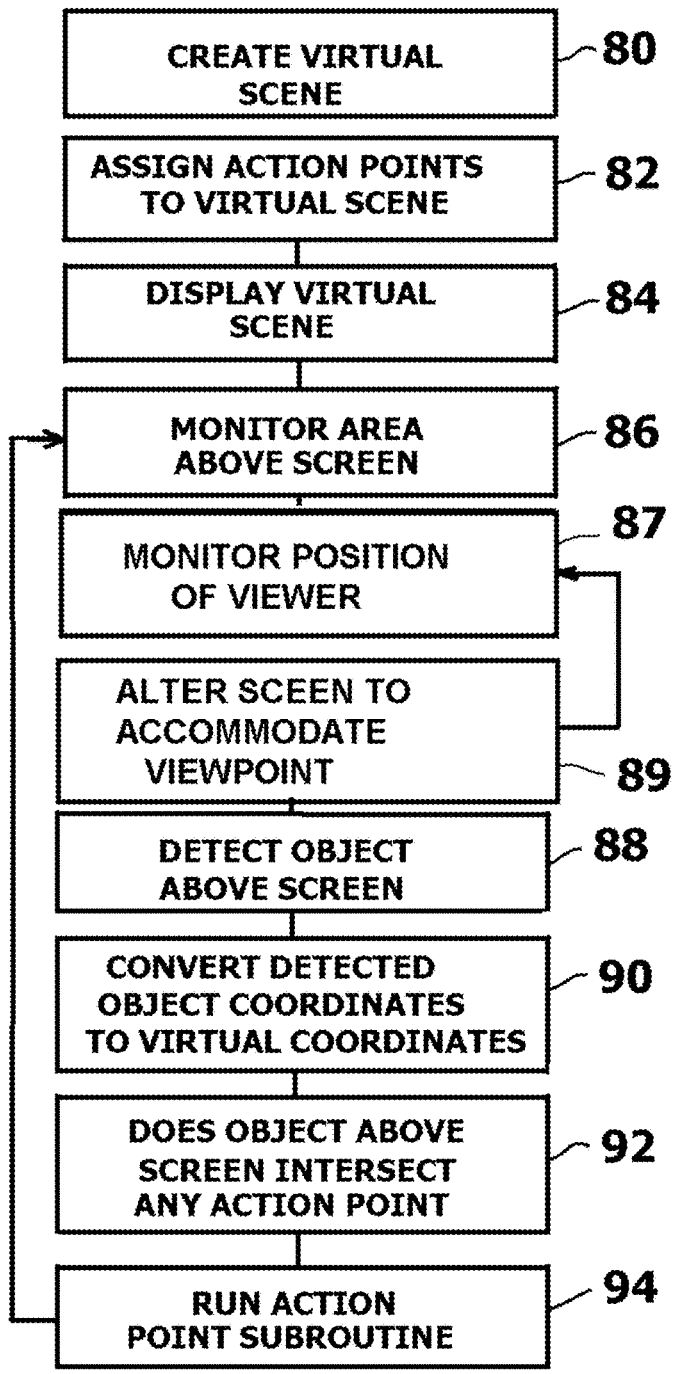
FIG. 10 is a block flow diagram showing a second software operational methodology associated with the invention.

Referring to FIG. 10 in conjunction with FIG. 6 through FIG. 9, it will be understood that a virtual scene 52 is created using commercially available graphic software. See Block 80. The virtual scene 52 is three-dimensional, using any manner of auto-stereoscopic 3D image creation technologies. Within the virtual scene 52, and using the interactive software programming developed to detect input and control response and feedback, a programmer places action points 56 and assigns subroutines to the action points 56. See Block 82. The virtual scene 52 is then shown on the electronic display 50. See Block 84.

The sensor array 60 is activated, wherein the sensor array 60 scans both the monitored area 70 above the electronic display 50 and the location of a viewer's head/face 66 surrounding the electronic display 50. See Block 86 and Block 87. The virtual scene 52 is altered to optimize 3D effects and the position of action points at the distance D1, angle of elevation A1, and position right or left of the centerline 68 of the viewer's head/face 66. See Block 89. This process is repeated at a very fast rate, so as to be continuously effective without detectable interruption by, and without being obvious to, the viewer.

If a person moves a physical object or beam of light into the monitored area 70 proximate the electronic display 50, then the physical object is detected by the object detection sensors 63 in the sensor array 60. See Block 88. The position of the manually controlled object is converted into the virtual coordinates of the virtual scene 52. See Block 90.

If the virtual coordinates of a manually controlled object intersect the virtual coordinates of an action point 56, then a subroutine is run and the virtual scene 52 is altered. See Block 92 and Block 94. The process is looped, so as to be continuously interactive.

It will be understood that the embodiments of the present invention that are illustrated and described are merely exemplary and that a person skilled in the art can make many variations to those embodiments. All such embodiments are intended to be included within the scope of the present invention as defined by the appended claims.

What is claimed is:

1. A method of interacting with a virtual object in a virtual environment, comprising the steps of:

providing an electronic device with a display and a first area forward of said display that has real coordinates, wherein said electronic device runs software that produces a virtual scene on said display, and wherein said virtual scene includes at least one three-dimensional virtual object at appear to a viewer to extend out of said display into said first area;

providing a sensor array that includes object detection sensors that detects a physical object that enters said first area forward of said display and provides said electronic device with object coordinates for said physical object within said real coordinates of said first area;

displaying said virtual scene on said display, wherein said virtual scene contains a three dimensional virtual object that appears, at least in part, to extend away from said display and into said first area;

wherein said virtual object has virtual coordinates in said virtual scene that appears to said viewer to correspond to some of said real coordinates within said first area when said virtual scene is viewed in said first area;

assigning at least one virtual action point to at least one of said real coordinates that appears to correspond to at least one of said virtual coordinate points of said virtual object;

providing a subroutine in said software that alters said virtual object when activated; and activating said subroutine when said sensor array detects a physical object in said first area that moves to one of said real coordinates that is assigned to said at least one virtual action point.

2. The method according to claim 1, further including providing a plurality of subroutines that each causes a different alteration in said virtual object, wherein said virtual object has a plurality of virtual action points assigned thereto and each of said virtual action points is capable of triggering a different one of said plurality of subroutines.

3. The method according to claim 1, wherein providing a sensor array that monitors a first area proximate said display includes providing a detection module that is separate and distinct from said display, wherein said detection module contains said sensor array and is positioned adjacent said display so that said sensor array faces said first area.

4. The method according to claim 1, wherein providing a sensor array that monitors a first area proximate said display includes building said sensor array into said display, wherein said sensor array faces said first area.

5. The method according to claim 1, wherein said sensor array contains imaging sensors that can detect a face of a viewer looking at said display.

6. The method according to claim 5, further including running software for detecting a position of a viewer's face relative said display wherein said software adjusts said virtual scene to compensate, at least in part, for said position.

7. A method of interacting with a virtual object in a virtual environment, comprising the steps of:

providing an electronic device having a display and a sensor array that detects physical objects passing over said display in a first area, wherein said electronic device runs software that produces a virtual scene with a three dimensional virtual object that appears, at least in part, to extend out of said display and into said first area;

providing a subroutine in said software that alters said virtual object when activated; and activating said subroutine when said sensor array detects a manually manipulated object in said first area that appears to intersect said virtual object.

8. The method according to claim 7, wherein said virtual object has a plurality of action points assigned thereto and each of said action points is capable of triggering a different one of a plurality of subroutines that each causes a different alteration in said virtual object.

9. The method according to claim 8, wherein said sensor array includes imaging sensors that can detect a face of a viewer looking at said display.

10. The method according to claim 9, further including running software for detecting a position of a viewer's face relative said display wherein said software adjusts said virtual scene to compensate, at least in part, for said position.

* * * * *